July 9, 1935.   H. A. HOKE   2,007,569
VALVE OPERATING ROD FOR LOCOMOTIVES
Filed Dec. 17, 1932
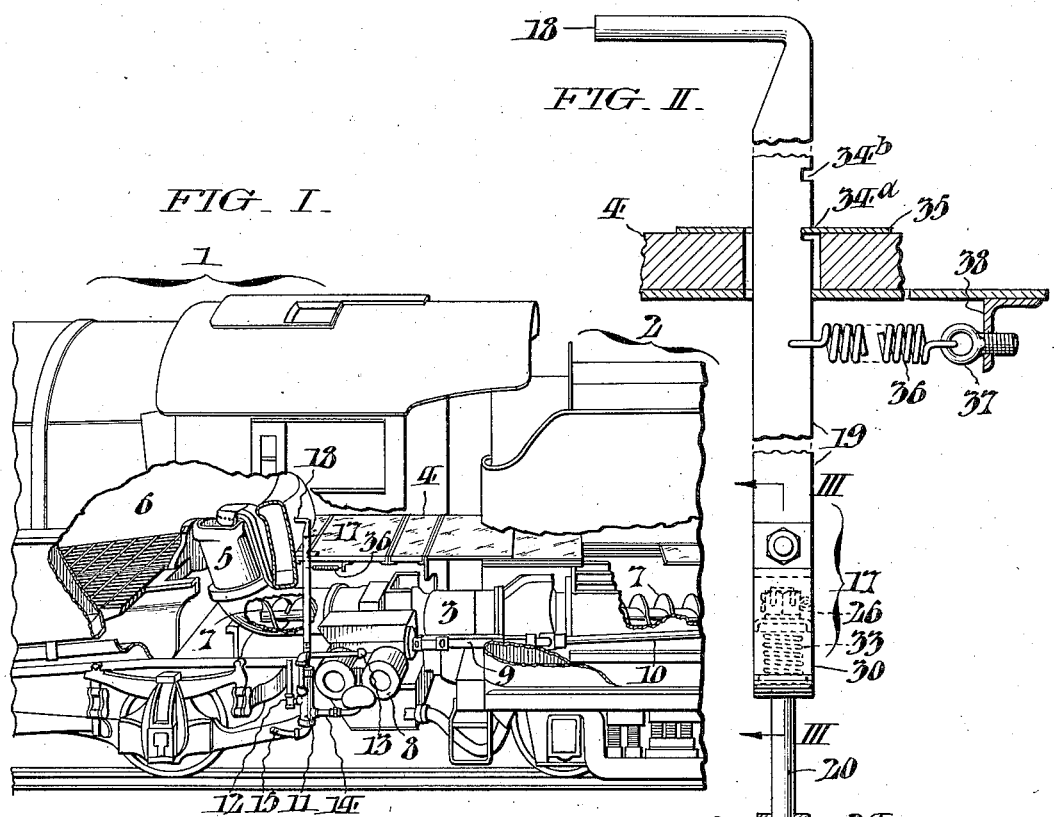
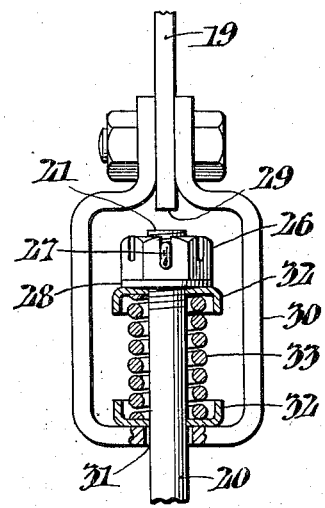
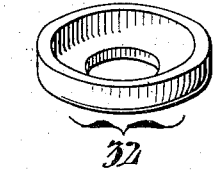
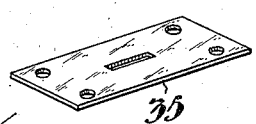
WITNESSES:
INVENTOR:
Harry A. Hoke,
BY
ATTORNEYS.

Patented July 9, 1935

2,007,569

UNITED STATES PATENT OFFICE 2,007,569

VALVE OPERATING ROD FOR LOCOMOTIVES

Harry A. Hoke, Altoona, Pa.

Application December 17, 1932, Serial No. 647,836

5 Claims. (Cl. 105—37)

This invention relates to valve operating rods for locomotives, and while capable of a variety of uses, is especially applicable to a rod for operating the reversing valve of a stoker engine. Heretofore it has been common practice to locate the stoker driving engine of a locomotive on the underframe beneath the locomotive cab, and to employ a valve operating rod extending upward through the floor of the cab and terminating in a handle near the fireman's seat. The handle end of the valve operating rod is customarily locked to the cab floor in alternate positions to effect starting, stopping, and reversing of the stoker engine. With such an arrangement it will be apparent that, incident to vibration or other movement of the cab floor with respect to the locomotive frame, a severe strain is placed upon the valve operating rod, often causing the rod to break and resulting in an engine failure.

The object of the invention is to overcome failures of this nature by the provision of means for relieving such a valve operating rod of undue strain, while permitting the rod to function efficiently in controlling the operation of the device to which it is applied. To this end the valve operating rod of my invention is made up of a plurality of interfitting sections flexibly connected, having capacity for limited relative movement, resilient means being interposed between the sections.

Other objects and advantages characterizing my invention will become more fully apparent from the description hereinafter set forth of one example or embodiment thereof, the description having reference to the accompanying drawing.

Of the drawing:

Fig. I represents a perspective view of part of a steam locomotive with certain portions of the cab and tender broken away to illustrate the stoker apparatus.

Fig. II represents an enlarged view of the stoker engine reversing valve and the operating rod therefor.

Fig. III represents an enlarged view of the flexible joint between the upper and lower sections of the valve operating rod, being partly in section as indicated by the lines III—III of Fig. II.

Fig. IV represents a perspective view of one of the disks employed for housing the ends of the spring of the flexible joint; and, Fig. V represents a perspective view of a keeper plate attached to the floor of the cab and through which the valve operating rod passes.

In Fig. I of the drawing, there are shown portions of a steam locomotive 1 and tender 2 equipped with a well-known type of stoker. The stoker comprises generally a conveyor trough 3, which leads from the tender 2 forward beneath the cab floor 4 and terminates in a vertical conduit 5 at the fire box 6, a conveyor screw 7, and a driving engine 8. The driving engine 8 actuates a shaft 9 and connecting shaft 10 (the latter being geared to the conveyor screw 7 by means not shown in the drawing) to effect rotation of the conveyor screw and hence to convey fuel from the tender 2 to the fire box 6.

Associated with the stoker driving engine 8 there is a reversing valve 11, an enlarged view of which is represented in Fig. II. The body of the reversing valve 11 has thereon a pipe connection 12 through which live steam from the boiler enters, additional pipe connections 13 and 14 leading to opposite ends of the cylinders of the stoker engine 8, and a pipe connection 15 leading to the atmosphere. Movement of the piston valve 16 to different positions within the valve body 11 causes steam from the boiler to be admitted to one end of the cylinders of the stoker engine 8 or the other, or to be cut-off from the stoker engine, thus controlling the direction of rotation of the drive shaft 9 and hence of the conveyor screw 7, as well as the starting and stopping of the same.

As thus far described, the stoker and its driving engine are similar to apparatus now in common use on locomotives, and the operation of such apparatus is well understood by those familiar with the art. For controlling the movement of the piston valve 16, I provide a special form of operating rod 17. The rod 17 extends upward through the cab floor 4 and terminates in a handle 18, which is preferably disposed in front of the fireman's seat at the left hand side of the cab, though there are other desirable locations for the operating rod handle 18 which are also contemplated.

The valve operating rod 17 comprises an upper section 19 and a lower section 20, the latter section serving in effect as the valve stem. The lower section 20 of the valve operating rod is attached by means of nuts 22 to a packing ring 23, the packing ring constituting an integral part of the piston valve 16. At the point where the lower section 20 of the valve operating rod 17 passes through the cover 24 of the valve body 11, there is provided a gland 25. The upper threaded end 21 of the lower section 20 of the valve operating rod 17 has thereon a slotted nut 26 which is preferably held against rotation by means of a cotter pin 27 and which may have associated therewith a washer 28.

The upper section 19 of the valve operating rod 17 terminates at its lower end in a flat surface 29 affording an abutment adapted to engage the upper end 21 of the lower rod section 20. Bolted to the upper rod section 19 there is a yoke 30 having an opening 31 in the lower end thereof, this opening being of larger diameter than that of the rod section 20. The lower rod section 20 passes through the opening 31. Between the nut 26 with its washer 28 and the lower end of the yoke 30, there is provided a helical spring 33 and a pair of disks 32, one of which is shown in perspective in Fig. IV, which house the opposite ends of the spring 33. In an obvious manner the upper rod section 19 may be swung forwardly or rearwardly within the opening in the cab floor 4 with the yoke 30 serving in effect as a pivotal connection between the upper and lower rod sections. It will thus be apparent that the valve operating rod 17 comprises interfitting sections 19, 20 which are flexibly connected in such manner that they have capacity for limited relative movement in the direction of their length, as well as capacity for relative angular movement.

The upper rod section 19 has notches 34a, 34b at the side edge thereof which notches are adapted to engage a keeper plate 35 secured to the cab floor 4, an enlarged view of which is represented in Fig. V. To maintain the valve operating rod 17 in locked position, a laterally acting helical spring 36 is provided. One end of this spring 36 is attached to the rod section 19. The other end of the spring 36 is attached to an eye bolt 37 screwed into an angle bracket 38 on the under side of the cab floor 4. The operating rod 17 and the piston valve 16 carried thereon may be moved to any one of three different positions by means of the handle 18 in the locomotive cab.

With the valve operating rod 17 in its fully raised position, as shown in Fig. II, the notch 34a of the rod engages the keeper plate 35. This position is conveniently designated the "running position". With the sections 19, 20 of the valve operating rod 17 in running position, the helical spring 33 is compressed, the packing ring 23 abuts against the cover 24 of the valve body 11, and the flat surface 29 of the upper rod section 19 is spaced from the threaded end 21 of the lower rod section 20. The spring 33 tends to draw the sections 19, 20 together and hence maintains the piston valve 16 in a fixed position within the valve body 11, even though the cab floor may vibrate or move laterally or vertically with relation to the stoker driving engine 8. Moreover, the spring 33 relieves the valve operating rod of the strain to which it would otherwise be subjected if the sections of the rod were rigidly connected together.

When the valve operating rod 17 is pushed downward to an intermediate position, the notch 34b of the rod engages the keeper plate 35. This position is conveniently designated the "neutral position". When the sections 18, 19 of the valve operating rod 17 are moved to neutral position, the helical spring 33 is allowed to expand and the flat surface 29 of the upper rod section 19 is caused to abut against the threaded end 21 of the lower rod section 20. The piston valve 16 is maintained in a neutral position within the valve body 11, shutting off the admission of steam to the cylinders of the stoker driving engine 8, and causing the stoker apparatus to be at rest. In this position there is obviously no strain upon the valve operating rod 17.

When the valve operating rod 17 is pushed further downward to its fully depressed position, the rod is not locked to the keeper plate 35, and there is no notch required for this position which is conveniently designated the "reversing position". With the sections 19, 20 of the valve operating rod 17 in reversing position, the spring 33 is expanded, the flat end 29 of the upper section 19 abuts against the lower section 20, and the piston valve 16 is at its lower limit of travel. There is no strain upon the valve operating rod 17 for it is not locked to the keeper plate 35.

The degree of compression of the spring 33 may be adjusted in an obvious manner by means of the nut 26. The spring 33 is so designed and adjusted that it serves to maintain the lower section 20 of the valve operating rod 17 fixed with respect to the valve body 11 when the upper section is locked in running position.

From the above description it will be apparent that the valve operating rod of this invention functions efficiently to control the action of the stoker driving engine and that under no condition is there any undue strain placed upon the valve operating rod. While I have described one example of my invention as applied to a valve rod for a stoker engine, it will, of course, be apparent that the invention may be applied to other types of valve rods, and that the form of apparatus herein specifically described admits of many changes without departing from the spirit of my invention as defined in the annexed claims.

Having thus described my invention, I claim:

1. In combination with a locomotive, a valve body attached to the locomotive frame beneath the cab, a valve operating rod extending upward from said valve body through the cab floor and adapted to be locked thereto in different positions, said operating rod comprising interfitting sections having capacity for limited relative movement in the direction of their length, and resilient means tending to draw said sections together, said means maintaining the operating rod sections in contiguous relation when the operating rod is locked in one position, and maintaining the valve against the valve body when the operating rod is locked in another position.

2. In combination with a locomotive, a valve body attached to the locomotive frame beneath the cab, a valve operating rod extending upward from said valve body through the cab floor and adapted to be locked thereto in different positions, said operating rod comprising upper and lower interfitting sections having capacity for limited relative movement in the direction of their length, and a spring tending to draw said sections together, said spring maintaining the operating rod sections in contiguous relation when the operating rod is locked in one position, and maintaining the valve against the valve body when the operating rod is locked in another position.

3. In combination with a locomotive, having a valve body attached to the locomotive frame beneath the cab, and a valve movable in said valve body, an operating rod for said valve extending upward through the cab floor and adapted to be locked thereto in alternate raised and lowered positions to open and close said valve, said operating rod comprising upper and lower interfitting sections having capacity for limited relative movement in the direction of their length, and a spring between said upper and lower sections tending to draw said sections together, said spring being compressed when the operating rod is in raised position, and then serving to hold said valve against the valve body incident to vibration of the cab floor, and said spring serving to maintain the sections of the operating rod in contiguous relation when the rod is locked in lowered position.

4. In combination with a locomotive, a valve body attached to the locomotive frame beneath the cab, a valve operating rod extending upward from said valve body through the cab floor and adapted to be locked thereto in different positions, said operating rod comprising upper and lower sections flexibly connected and having capacity for limited relative movement in a vertical direction, as well as relative angular movement, and resilient means tending to draw said sections together, said means maintaining the operating rod sections in contiguous relation when the operating rod is locked in one position, and maintaining the valve against the valve body when the operating rod is locked in another position.

5. In combination with a locomotive, a valve body attached to the locomotive frame beneath the cab, a valve operating rod extending upward from said valve body through the cab floor and terminating in a handle, said operating rod comprising interfitting sections flexibly connected and having capacity for relative movement in a vertical direction as well as relative angular movement about their connection, and the handle section having notches adapted to engage the cab floor to hold the rod in alternate positions, a spring tending to maintain the handle section in engagement with the cab floor, and an additional spring tending to draw said sections together in a vertical plane.

HARRY A. HOKE.